Nov. 15, 1966 G. R. BEST 3,284,878

METHOD OF FORMING THIN FILM RESISTORS

Filed Dec. 9, 1963

INVENTOR.
Gary R. Best

BY Clarence R. Patty, Jr.
ATTORNEY 3,284,878
Patented Nov. 15, 1966

3,284,878

METHOD OF FORMING THIN FILM RESISTORS

Gary R. Best, Raleigh, N.C., assignor to Corning Glass Works, Corning, N.Y., a corporation of New York Filed Dec. 9, 1963, Ser. No. 329,046
3 Claims. (Cl. 29—155.7)

This invention relates to a method of forming electrical resistors and more particularly to a method of adjusting the resistance of thin films by selectively removing portions thereof.

Electrically conductive films of metal oxide are quite well known and have come into extensive use in connection with forming resistors within microcircuits. There are many inherent difficulties in the deposition and patterning of thin film microcircuit resistors resulting in out of tolerance resistance values. Consequently, such resistors are formed with films having resistance values less than ultimately desired, which films are thereafter adjusted by increasing the resistance thereof to the desired value. The resistance of thin film resistors may be increased by decreasing the film thickness or by increasing the length to width ratio thereof.

One prior art method of adjusting the film resistance by increasing the length to width ratio thereof comprised applying an electroconductive film to a substrate, photographically forming a mask over said film, and thereafter selectively removing a portion of said film around said mask. Such a method required application of the mask material, photographic processing of the material to remove predetermined portions thereof thereby exposing a portion of said film, removal of selected portions of the exposed film, and thereafter removal of said mask. It has been found that such a method is costly and time consuming, and control of the selective removal of the unmasked film is difficult.

It is an object of the instant invention to provide a method for economic and rapid adjustment of resistance of thin film resistors.

Another object of the instant invention is to provide a method for accurately removing a selected portion of the resistance film of thin film resistors.

Still another object is to provide a method for removing selected portions of a thin resistance film without deleteriously affecting the remaining film.

In accordance with this invention the method in its broader aspect comprises applying an electroconductive film having a resistance of less than a predetermined value on a dielectric substrate, applying a resist material over said film, simultaneously removing a portion of both said film and said resist by sandblasting to increase the length to width ratio thereof thereby increasing the resistance of said film to said predetermined value, and thereafter removing the balance of said resist material.

Additional objects, features, and advantages of the present invention will become apparent to those skilled in the art, from the following detailed description and the attached drawing, on which, by way of example, only the preferred embodiment of the invention is illustrated.

Figure 1:
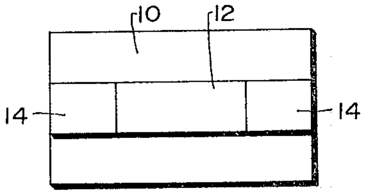
FIGURE 1 is a plan view of a dielectric substrate with an electroconductive film resistor applied thereon.

In FIGURE 1 there is shown a dielectric substrate 10 having applied thereon an electroconductive film 12 which forms the resistance element. Resistor terminals 14 are also applied on said substrate in electrical contact with film 12. For one example of a suitable electroconductive film, its characteristics and method of application, reference is made to U.S. Patent No. 2,564,706 issued to John M. Mochel. Suitable dielectric substrate materials are glass, ceramics and the like.

Figure 2:
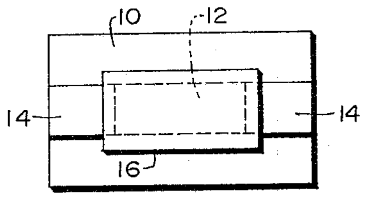
FIGURE 2 is a plan view of a substrate of FIGURE 1 with resist material applied over the electroconductive film.

A coating 16 of a resist material is applied over film 12 as illustrated in FIGURE 2. Various resist materials may be used, however, some are superior to others. Suitable resist materials must not only be compatible with the electroconductive film and be capable of being easily applied, but must have resiliency such that a stream of sandblast particles will remove said resist material and film directly in the path of the stream, only, while stray sandblast particles will not remove the resist material but will simply bounce off. Further, said resist material must not be too brittle since the sandblast stream would chip it and thereafter undercut the electroconductive film. Examples of suitable resist materials are beeswax, silicone grease, synthetic resinous materials such as polyvinyl chloride, chloroprenes and the like.

Figure 3:
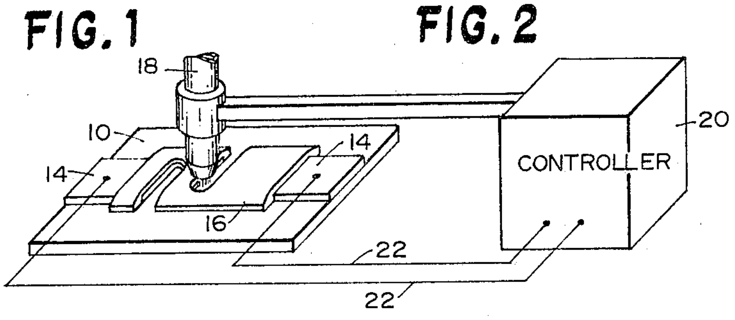
FIGURE 3 is a diagrammatic illustration of an apparatus suitable for carrying out the method of this invention.
Figure 4:
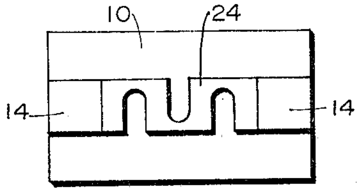
FIGURE 4 is a plan view of a film resistor formed in accordance with the method of this invention.
Figure 5:
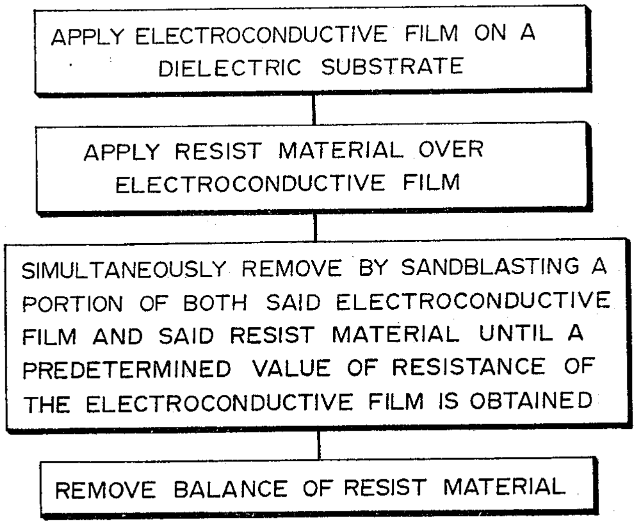
FIGURE 5 is a flow diagram illustrating the steps of the method of this invention.

In FIGURE 3 there is shown a typical apparatus for adjusting the resistance of film 12 by increasing the length to width ratio thereof. A sandblasting nozzle 18 is caused to move in a predetermined fixed path over the resist material and the electroconductive film by means of controller 20. The film resistance is sensed by controlled 20 by means of leads 22 which are connected to resistor terminals 14. As controller 20 causes nozzle 18 to move in a predetermined path, a jet or stream of sandblast particles is emitted from said nozzle and directed at said resist material simultaneously removing a selected portion of both said resist material and said film in the direct path of said stream of particles. The flow of sandblast particles and movement of nozzle 18 is controlled by controller 20. When an area of electroconductive film 12 has been removed sufficient to adjust the film resistance to a predetermined value as sensed by controller 20, said controller stops the flow of said particles and stops the movement of said nozzle. Controller 20 does not form part of this invention and any controlling means responsive to the resistance of film 12 and capable of regulating the flow of sandblast particles and movement of nozzle 18 is suitable for the purpose of this invention. A suitable controller can be readily selected by one familiar with the art. After the desired resistance of film 12 is obtained, the remainder of coating 16 is removed by a suitable solvent providing an adjusted thin film resistor 24 as illustrated in FIGURE 4. A suitable solvent is determined by the resist material used and can be readily selected by one familiar with the art.

A typical example of carrying out the present invention is illustrated by the following. An electroconductive film of the type described in the heretofore noted Mochel patent, together with a pair of copper terminals in electrical contact with said film were applied to a hot pressed alumina substrate. A coating of beeswax having a thickness of about 0.003 inch was applied over said film. A 0.0075 inch diameter sharp edge orific nozzle was employed as the sandblast nozzle. Said nozzle provided a particle stream having a straight pattern for a distance of $\frac{1}{32}$ of an inch from the nozzle and a pattern having a 7° included angle thereafter. The sandblast stream comprised aluminum oxide powder having an approximate particle size of 27 microns and dry air at a pressure of from 60 to 120 per square inch. With the nozzle being moved along a predetermined path at a distance of from 0.030 to 0.050 inch from the resist surface, a path of between 0.010 and 0.012 inch wide was simultaneously cut from the electroconductive film and the beeswax. The remaining beeswax was thereafter removed by a trichloroethylene bath. The remaining electroconductive film had smooth edges along the sandblasted path with no apparent film undercutting.

Another example of carrying out this invention is illustrated by the following. A resistor formed as described in the above example, with the resist material being polyvinyl chloride resin. The resin was type PVW 200 T manufactured by the Advance Process Supply Company of Chicago, Illinois.

Although the present invention has been described with respect to specific details of certain embodiments thereof it is not intended that such details be limitations on the scope of the invention except insofar as set forth in the following claims.

I claim:

1. In the process of adjusting the resistance of a thin film resistor comprising the steps of applying an electroconductive film having a resistance less than a predetermined desired value on a dielectric substrate, and thereafter removing a portion of said film to increase the length to width ratio thereof, the improvement comprising applying a resist material over said film, simultaneously removing a portion of both said film and said resist material by sandblasting thereby increasing the resistance of said film to said value, and thereafter removing the balance of said resist material.

2. The process of forming an electrical resistor comprising the steps of providing a dielectric substrate, applying an electroconductive film on said substrate having a resistance less than a desired value, applying a coating of resist material over said film, directing a sandblasting stream to said resist material and simultaneously removing a portion of both said resist material and said electroconductive film to increase the length to width ratio thereby increasing the resistance of said film to said value.

3. The process of forming an electrical resistor comprising the steps of providing a dielectric substrate, applying an electroconductive film on said substrate having a resistance less than a desired value, applying a coating of resist material over said film, directing a sandblasting stream to said resist material and simultaneously removing a portion of both said resist material and said electroconductive film to increase the length to width ratio of said film thereby increasing the resistance thereof to said value, and thereafter removing the balance of said resist material.

References Cited by the Examiner

UNITED STATES PATENTS

| | | | |
|---|---|---|---|
| 1,859,112 | 5/1932 | Silberstein | 29—155.7 X |
| 2,629,166 | 2/1953 | Marsten et al. | 29—155.7 |
| 2,985,050 | 5/1961 | Schwacha | 83—177 X |
| 3,022,570 | 2/1962 | Taylor | 29—155.7 |

JOHN F. CAMPBELL, *Primary Examiner.*

J. M. ROMANCHIK, Jr., *Assistant Examiner.*